Nov. 29, 1927.  
J. A. GAYLORD  
1,650,705  
SEED GATHERING REEL ATTACHMENT FOR MOWING MACHINES  
Filed June 6, 1925  2 Sheets-Sheet 1
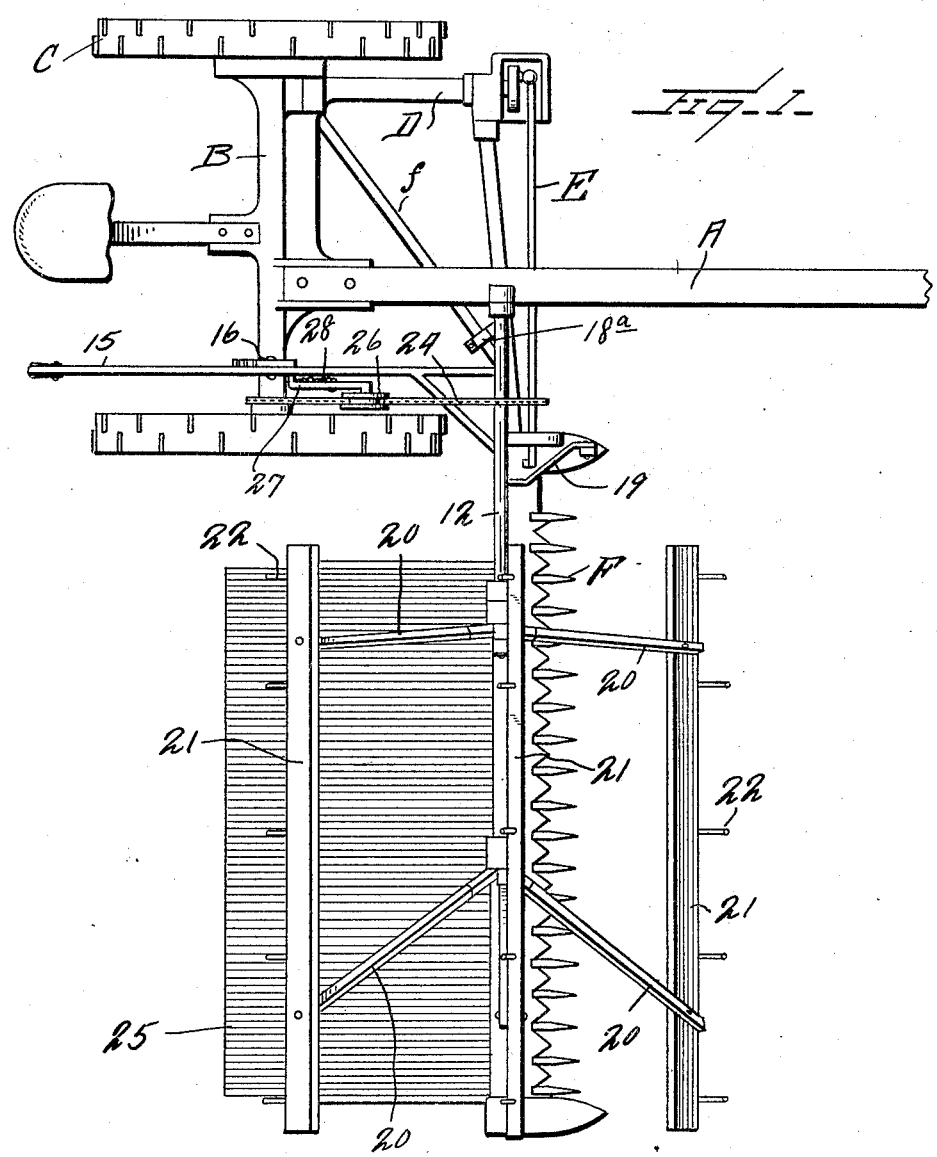
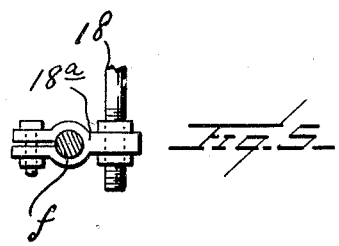
Inventor  
J. A. Gaylord  
By Watson E. Coleman  
Attorney

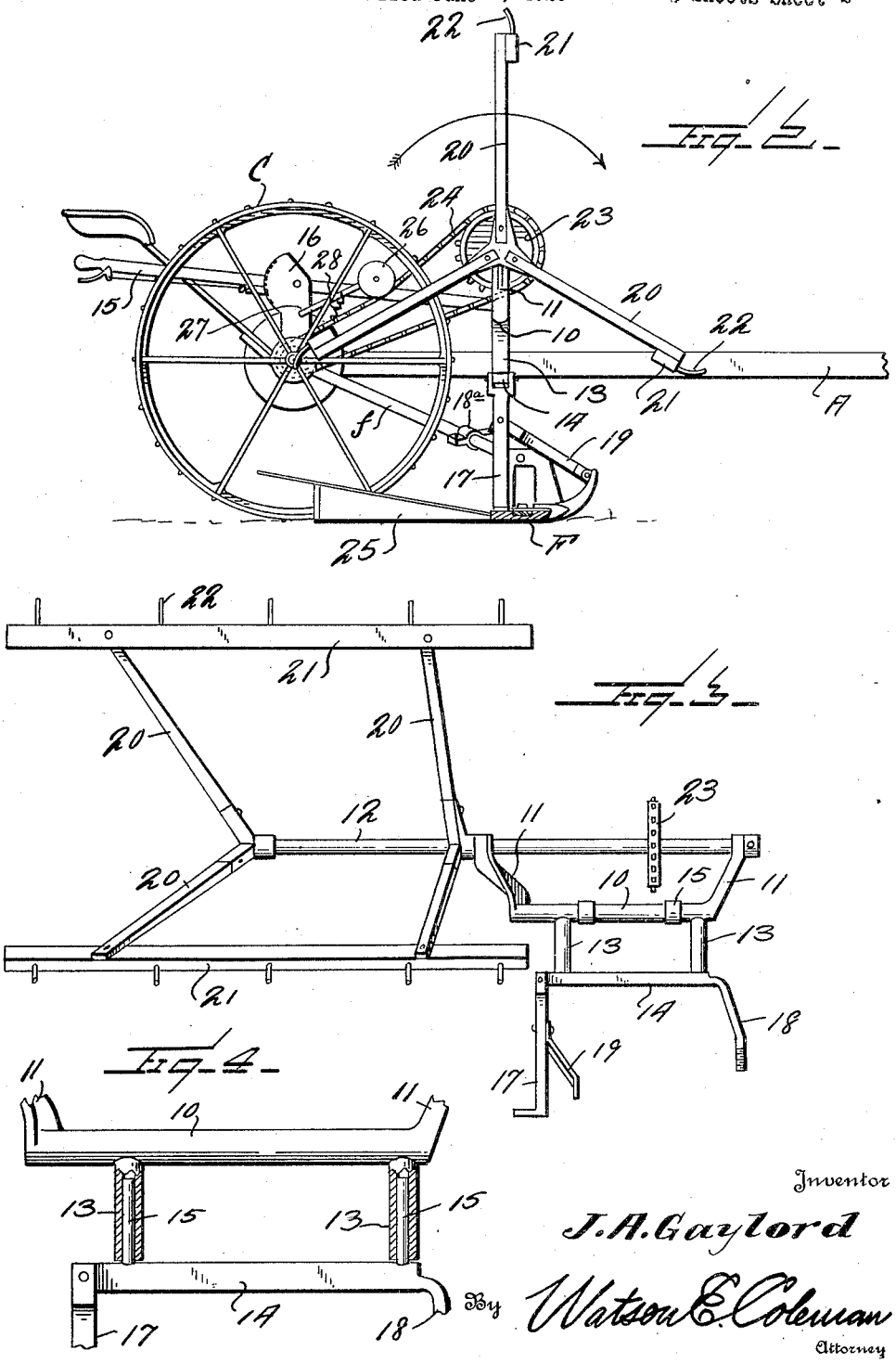

Patented Nov. 29, 1927.

1,650,705

UNITED STATES PATENT OFFICE.

JAMES A. GAYLORD, OF SHARON, TENNESSEE, ASSIGNOR OF ONE-THIRD TO LILLIE GAYLORD, OF SHARON, TENNESSEE.

SEED-GATHERING REEL ATTACHMENT FOR MOWING MACHINES.

Application filed June 6, 1925. Serial No. 35,317.

This invention relates to mowing machines, and particularly to mowing machines designed for the purpose of cutting lespedeza grass or Japan clover, the object of the mechanism being to simultaneously cut this grass or clover and thrash or beat out the seed.

A further object is to provide an attachment for this purpose which is adapted to be applied to any ordinary mowing machine and which includes a pan for catching the seed, and a reel operated from the driving mechanism of the mowing machine and in which the reel is entirely supported upon the frame of the machine with practically no weight resting upon the cutter bar of the machine.

Another object is to provide driving means for the reel which is disposed not exteriorly of the reel but is disposed inward of that side of the reel which is toward the mowing machine to thereby prevent the long, thick grass from becoming entangled by the driving mechanism.

Still another object is to provide means whereby the frame-supported reel may be raised or lowered to suit the height of the grass, this being a very important necessity in mechanism for cutting lespedeza grass.

Other objects will appear in the course of the following description.

My invention is illustrated in the accompanying drawings, wherein:—

Figure 1 is a top plan view of my improved seed gathering reel attachment applied to a mowing machine;

Figure 2 is a side elevation of the mowing machine with my attachment applied;

Figure 3 is a front elevation of the attachment alone;

Figure 4 is a sectional view through the parts 13—13 and showing the parts 10 and 14 in elevation;

Figure 5 is a sectional view showing the manner in which the member 18 is engaged with the brace $f$;

Referring to the drawings, it will be seen that I have illustrated a mowing machine of the ordinary type having the usual tongue A, the supporting frame designated generally B, the traction wheels C from which power is derived to operate the cutter bar, the shaft housing D having the usual crank operating the cutter bar, and a pitman E, this pitman in turn acting upon the cutter bar F mounted upon the usual cutter bar guides.

The frame for the reel consists of a transversely elongated yoke, designated 10, having two outwardly and forwardly extending arms 11, each of these arms carrying bearings for the shaft 12, this shaft being the reel shaft. This bar 10 has extending down from it the tubular members 13 and extending parallel to the bar 12 is a lower bar 14 having two upwardly extending members 15 which are adapted to telescope within the tubular members 13 or in other words act as guides for these tubular members 13 so as to permit the bar or yoke 10 to be raised or lowered relative to the cross bar 14. This yoke or bar 10 is adapted to be raised or lowered by means of a lever 15 fulcruming upon a member 16 projecting from the main frame of the machine. Means are provided whereby this lever may be held in its adjusted position, this means being of any suitable type but illustrated as including a rack over which the lever moves, and a bolt carried by the lever and engaging said rack. Carried upon the ends of the cross bar 14 is a downwardly and forwardly extending arm 17 which is adapted to engage the cutter bar. The other end of this bar 14 carries the arm 18 which at its end is engaged by a clamp 18$^a$ which engages the brace $f$. Projecting from the upper end of the arm 17 is a rod or brace 19 which engages the slide of the cutter bar F.

The shaft 12 extends out beyond the body of the mowing machine and parallel to the cutter bar of the machine but rearward of the same, and mounted upon this shaft 12 for rotation therewith is the reel consisting preferably of three pairs of arms, designated 20, these arms being radial and each pair of arms supporting a cross bar 21 having outwardly projecting, slightly curved fingers 22. This shaft 12 carries upon it the sprocket wheel 23 which is engaged by a sprocket chain 24, this sprocket chain extending to the sprocket gear wheel mounted upon any suitable driving element of the machine, as upon a shaft driven by the traction wheel driving mechanism of the mowing machine. The particular means for driving this shaft and thereby driving the shaft 12 may be obviously changed and will depend entirely upon the make of the machine.

It will be noted that the arms 20 extend outward longitudinally at an angle to the shaft 12 greater than a right angle. Supported rearward of the cutter bar and moving over the ground or grass rearward of the cutter bar is a receiving pan 25. The reel in its movement strikes the cut grass, detaching the seed therefrom, which falls into the pan and the reel carries the grass upward and over the pan and distributes it behind the pan and thus the hay is thrashed and cut at the same time. For the purpose of holding the sprocket chain 24 taut, I provide the chain tightener roller 26 which bears against the sprocket chain and is mounted upon a lever 27 pivoted upon the bracket 16 and urged downward by a spring 28. Any suitable chain tightener might be used for this purpose. This permits the chain 24 to be of sufficient slackness as will allow the vertical elevation or depression of the supporting bar 10 with relation to the cross bar 14 while at the same time the chain will be kept tight.

It will be seen this device is particularly adapted for saving lespedeza seed, and for the reason that it is absolutely necessary that the reel shaft be adjustable vertically in order to increase or decrease the height of the reel above the cutter bar, depending upon the height of the grass. It is to be particularly noted that my reel is self-supporting and that it is entirely unsupported from the pan. If the reel be supported at all by the pan, then when the pan or its supporting wheel is moving over low ground or drops in a hole, the reel would be drawn backward also or to the rear of the pan and this would put the reel more or less out of operative position. Furthermore, it will be noted that none of the weight of my reel or its supporting structure are placed upon the cutter bar or cutter bar upright and thus no unnecessary weight is placed upon the cutter bar in my machine. The wheel is driven by a wheel and sprocket chain which are disposed between the main traction wheel C of the machine. This is important, as if this operating chain 24 with the sprocket wheel therefor were placed upon the outer end of the shaft 12, the chain would become easily entangled with hay and hay would pile up upon the bottom of the pan. Furthermore, if there is a support at the outer end of the pan for the shaft 12, the hay is very liable to hang upon this support.

My attachment is simply made, may be readily applied to ordinary mowing machines, and I have found it extremely effective for the purpose intended, that is, for the saving of lespedeza seed. It is obvious that the support for the machine and the details of construction might be modified in many ways without departing from the spirit of the invention, as defined in the appended claims.

I claim:

1. The combination with a mowing machine having a supporting frame, a cutter bar extending laterally of the supporting frame and mounted thereon, traction wheels, a driving mechanism for the cutter bar operated by the traction wheels, of a frame mounted upon the supporting frame of the mowing machine including a cross bar having two arms, a second named cross bar having upwardly extending members, the first named cross bar having downwardly extending members telescoping with the first named members, braces extending from the second named cross bar to a plurality of points on the frame of the mowing machine, a shaft mounted upon the upwardly extending arm of the first named cross bar and extending out parallel to and behind the cutter bar, a reel mounted upon the shaft, a pan entirely independent of the shaft and mounted behind the cutter bar, means for raising or lowering the first named cross bar relative to the second named cross bar, and means for driving said shaft from the operating members of the machine, said means being disposed adjacent the inner end of the reel shaft.

2. A reel attachment for mowing machines comprising a frame including a cross bar having two arms and a second cross bar having upwardly extending members, the first named cross bar having downwardly extending members telescoping with the first named members, the first named cross bar having upwardly extending shaft supporting bars at its extremities, a reel shaft supported in said arms and carrying a sprocket wheel, a reel mounted upon said shaft entirely to one side of said arms, a vertical member extending downward from the first named cross bar, an angularly disposed brace disposed from a vertical disposed member and an angularly disposed brace extending from the second named cross bar.

3. The combination with a mowing machine having a driving axle, a cutter bar and a supporting frame, of a pan attached to the cutter bar and extending rearward therefrom, a reel shaft mounted upon the supporting frame of the mowing machine extending laterally therefrom and immediately above the cutter bar, a reel carried upon said shaft, a bearing for the reel shaft having telescopic engagement with the supporting frame for bodily movement vertically, means operatively connected to the driving shaft of the mowing machine for driving the reel, and a lever mounted upon the supporting frame and operatively connected to the reel bearing whereby the reel may be raised and lowered.

4. The combination with a mowing machine having a supporting frame, an axle having traction wheels and a cutter bar extending laterally from the supporting frame, of a seed pan mounted upon the cutter bar extending rearward therefrom, a reel shaft operatively supported upon the supporting frame and extending laterally therefrom immediately above the cutter bar, in two spaced connected bearings for the reel shaft and having sliding engagement with the supporting frame at a plurality of points for bodily vertical movement toward or from the supporting frame, a lever mounted upon the supporting frame and operatively engaging the connected bearings of the reel shaft at its forward end, means for holding the lever in adjusted positions, a sprocket wheel mounted upon the reel shaft, a sprocket chain operatively engaging the driving axle of the mowing machine with said sprocket wheel but permitting the vertical movement of the reel shaft and its bearings, and means for yieldingly holding the sprocket chain taut.

In testimony whereof I hereunto affix my signature.

JAMES A. GAYLORD.